(12) United States Patent  
Biler et al.

(10) Patent No.: US 8,576,543 B2
(45) Date of Patent: Nov. 5, 2013

(54) SOLID ELECTROLYTIC CAPACITOR CONTAINING A POLY(3,4-ETHYLENEDIOXYTHIOPHENE) QUATERNARY ONIUM SALT

(75) Inventors: Martin Biler, Novy Jicin (CZ); Lubomir Kubac, Rybitvi (CZ); Radana Becvarikova, Hradec Kralove (CZ)

(73) Assignee: AVX Corporation, Fountain Inn, SC (US)

( * ) Notice: Subject to any disclaimer, the term of this patent is extended or adjusted under 35 U.S.C. 154(b) by 253 days.

(21) Appl. No.: 12/967,157

(22) Filed: Dec. 14, 2010

(65) Prior Publication Data

US 2012/0147529 A1 Jun. 14, 2012

(51) Int. Cl.
*H01G 9/00* (2006.01)
*H01G 4/06* (2006.01)

(52) U.S. Cl.
USPC .......................... 361/523; 361/524; 361/525

(58) Field of Classification Search
None
See application file for complete search history.

(56) References Cited

U.S. PATENT DOCUMENTS

| | | | |
|---|---|---|---|
| 2,453,103 A | 11/1948 | Turnbill, Jr. | |
| 3,345,545 A | 10/1967 | Bourgault et al. | |
| 4,945,452 A | 7/1990 | Sturmer et al. | |
| 5,111,327 A | 5/1992 | Blohm et al. | |
| 5,300,575 A | 4/1994 | Jonas et al. | |
| 5,344,902 A | 9/1994 | Harwood et al. | |
| 5,370,981 A | 12/1994 | Krafft et al. | |
| 5,457,862 A | 10/1995 | Sakata et al. | |
| 5,463,056 A | 10/1995 | Jonas | |
| 5,473,503 A | 12/1995 | Sakata et al. | |
| 5,519,147 A | 5/1996 | Swager et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,322,912 B1 | 11/2001 | Fife | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,517,892 B1 * | 2/2003 | Sakai et al. | 427/80 |
| 6,527,937 B2 | 3/2003 | Fife | |
| 6,528,662 B2 | 3/2003 | Jonas | |
| 6,576,099 B2 | 6/2003 | Kimmel et al. | |
| 6,592,740 B2 | 7/2003 | Fife | |
| 6,635,729 B1 | 10/2003 | Groenendaal et al. | |

(Continued)

FOREIGN PATENT DOCUMENTS

| | | |
|---|---|---|
| CZ | 301500 | 3/2010 |
| EP | 0440097 | 8/1991 |

(Continued)

OTHER PUBLICATIONS

Related U.S. Patent Application Form.

(Continued)

*Primary Examiner* — Jayprakash N Gandhi
*Assistant Examiner* — Dion Ferguson
(74) *Attorney, Agent, or Firm* — Dority & Manning, P.A.

(57) ABSTRACT

A solid electrolytic capacitor a solid electrolytic capacitor that includes an anode body, a dielectric overlying the anode body, and a solid electrolyte overlying the dielectric is provided. The capacitor also comprises a conductive polymer coating that overlies the solid electrolyte and includes nanoparticles formed from a poly(3,4-ethylenedioxythiophene) quaternary onium salt.

14 Claims, 1 Drawing Sheet

(56) References Cited

U.S. PATENT DOCUMENTS

| | | | |
|---|---|---|---|
| 6,639,787 B2 | 10/2003 | Kimmel et al. | |
| 6,696,138 B2* | 2/2004 | Sakai et al. | 428/209 |
| 6,756,473 B2 | 6/2004 | Reuter et al. | |
| 6,852,830 B2 | 2/2005 | Groenendaal et al. | |
| 6,891,016 B2 | 5/2005 | Reuter et al. | |
| 6,927,298 B2 | 8/2005 | Groenendaal et al. | |
| 6,987,663 B2 | 1/2006 | Merker et al. | |
| 7,053,174 B2 | 5/2006 | Kirchmeyer et al. | |
| 7,094,865 B2 | 8/2006 | Groenendaal et al. | |
| 7,102,016 B2 | 9/2006 | Reuter | |
| 7,105,237 B2 | 9/2006 | Sotzing | |
| 7,116,548 B2 | 10/2006 | Satterfield, Jr. et al. | |
| 7,118,690 B2 | 10/2006 | Wessling et al. | |
| 7,154,740 B2 | 12/2006 | Merker et al. | |
| 7,220,397 B2 | 5/2007 | Kimmel et al. | |
| 7,262,511 B2 | 8/2007 | Osako et al. | |
| 7,279,015 B2 | 10/2007 | Merker | |
| 7,341,705 B2 | 3/2008 | Schnitter | |
| 7,341,801 B2 | 3/2008 | Reuter et al. | |
| 7,358,326 B2 | 4/2008 | Heuer et al. | |
| 7,377,947 B2 | 5/2008 | Merker et al. | |
| 7,381,396 B2 | 6/2008 | Thomas et al. | |
| 7,411,779 B2 | 8/2008 | Merker et al. | |
| 7,419,926 B2 | 9/2008 | Schnitter et al. | |
| 7,438,832 B2 | 10/2008 | Majumdar et al. | |
| 7,449,588 B2 | 11/2008 | Jonas et al. | |
| 7,515,396 B2 | 4/2009 | Biler | |
| 7,569,158 B2 | 8/2009 | Waller et al. | |
| 7,578,859 B2 | 8/2009 | Reynolds et al. | |
| 7,585,983 B2 | 9/2009 | Reuter et al. | |
| 7,601,871 B2 | 10/2009 | Siggel et al. | |
| 7,641,807 B2 | 1/2010 | Siggel et al. | |
| 7,696,669 B2 | 4/2010 | Kudoh | |
| 7,714,124 B2 | 5/2010 | Scheibel et al. | |
| 7,736,398 B2 | 6/2010 | Tateishi et al. | |
| 7,745,520 B2 | 6/2010 | Shao et al. | |
| 7,750,099 B2 | 7/2010 | Chikusa et al. | |
| 7,754,053 B2 | 7/2010 | Maase | |
| 7,785,493 B2 | 8/2010 | Jonas et al. | |
| 2003/0215571 A1 | 11/2003 | Tahon et al. | |
| 2005/0065352 A1 | 3/2005 | Brassat et al. | |
| 2006/0179627 A1* | 8/2006 | Sakai et al. | 29/25.03 |
| 2006/0180797 A1 | 8/2006 | Merker et al. | |
| 2007/0064376 A1 | 3/2007 | Merker et al. | |
| 2007/0139862 A1 | 6/2007 | Tateishi et al. | |
| 2008/0005878 A1 | 1/2008 | Merker et al. | |
| 2008/0210858 A1 | 9/2008 | Armstrong et al. | |
| 2008/0218942 A1 | 9/2008 | Yamagishi et al. | |
| 2009/0030149 A1 | 1/2009 | Morita et al. | |
| 2009/0244812 A1* | 10/2009 | Rawal et al. | 361/525 |
| 2009/0296317 A1 | 12/2009 | Naoi et al. | |
| 2009/0310285 A1 | 12/2009 | Reuter et al. | |
| 2009/0318710 A1 | 12/2009 | Brassat et al. | |
| 2009/0320771 A1 | 12/2009 | Torres, Jr. et al. | |
| 2010/0084600 A1 | 4/2010 | Ahmad et al. | |
| 2010/0103590 A1* | 4/2010 | Saida et al. | 361/525 |
| 2010/0148124 A1 | 6/2010 | Reuter et al. | |
| 2010/0172067 A1* | 7/2010 | Shibuya | 361/523 |

FOREIGN PATENT DOCUMENTS

| | | |
|---|---|---|
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Abstract of Article—Lee et al., "Electro-Conductive properties of poly(3,4-ethylenedioxythiophene)/poly(ionic liquid) films with respect to its structure and morphology," Synthetic Metal, vol. 159, Issues 23-24, Dec. 2009, pp. 2453-2457.

Abstract of Article—Pozo-Gonzalo et al., "PEDOT:Poly(1-vinyl-3-ethylimidazolium) dispersions as alternative materials for optoelectronic devices," Journal of Polymer Science, Part A: Polymer Chemistry, vol. 46, Issue 9, May 1, 2008 (Mar. 24, 2008), pp. 3150-3154.

Article—Cutler et al., "Alkoxysulfonate-Functionalized Pedot Polyelectrolyte Multilayer Films: Electrochromic and Hole Transport Materials," Macromolecules, vol. 38, No. 8, 2005, pp. 3068-3074.

Article—Groenendaal et al., "Poly(3,4-ethylenedioxythiophene) and Its Derivatives: Past, Present, and Future," Advanced Materials, vol. 12, No. 7, 2000, pp. 481-494.

Article—Kim et al., "Poly(3,4-ethylenedioxyth Derived from Poly(ionic liquid) for the Use as Hole-Injecting Material in Organic Light-Emitting Diodes," Macromolecular Rapid Communications, vol. 30, 2009, pp. 1477-1482.

Article—Hain et al., "Electric Conductance of Films Prepared from Polymeric Composite Nanoparticles," Marcromol. Symp., vol. 268, 2008, pp. 61-65.

Article—Stéphan et al., "Electrochemical behaviour of 3,4-ethylenedioxythiophene functionalized by a sulphonate group. Application to the preparation of poly(3,4-ethylenedioxythiophene) having permanent cation-exchange properties," Journal of Electroanalytical Chemistry, vol. 443, 1998, pp. 217-226.

Article—Tran-Van et al., "Sulfonated polythiophene and poly(3,4-ethylenedioxythiophene) derivatives with cations exchange properties," Synthetic Metals, Vol. 142, 2004, pp. 251-258.

Article—Neil Winterton, "Solubilization of polymers by ionic liquids," J. Mater. Chem., vol. 16, 2006, pp. 4281-4293.

Article—Zotti et al., "Electrochemical and Chemical Synthesis and Characterization of Sulfonated Poly(3,4-ethylenedioxythiophene): Water-Soluble and Highly Conductive Conjugated Oligomer," Macromol. Chem. Phys., vol. 203, No. 13, 2002, pp. 1958-1964.

Product Information from Strem Chemicals, Inc. on Ionic Liquids, 2008, 2 pages.

Thesis—Jennifer Nicole DeCerbo, 1-Alkyl-3-Methylimidazolium Bis(pentafluoroethylsulfonyl)imide Based Ionic Liquids: A Study of Their Physical and Electrochemical Properties, Wright State University, 2008, '12 pages.

* cited by examiner

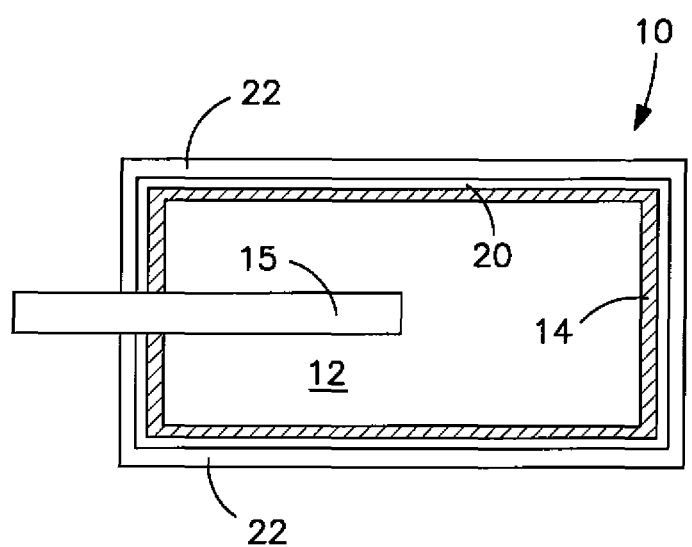

SOLID ELECTROLYTIC CAPACITOR CONTAINING A POLY(3,4-ETHYLENEDIOXYTHIOPHENE) QUATERNARY ONIUM SALT

BACKGROUND OF THE INVENTION

Solid electrolytic capacitors (e.g., tantalum capacitors) are often formed by pressing a metal powder (e.g., tantalum) around a metal lead wire, sintering the pressed part, anodizing the sintered anode, and thereafter applying a solid electrolyte. The solid electrolyte layer may be formed from a conductive polymer, such as described in U.S. Pat. Nos. 5,457,862 to Sakata, et al., 5,473,503 to Sakata, et al., 5,729,428 to Sakata, et al., and 5,812,367 to Kudoh, et al. The conductive polymer electrolyte is traditionally formed by sequentially dipping the part into separate solutions of the monomer used to form the polymer, as well as the catalyst and dopant for the monomer. One problem with this technique is that it is often difficult and costly to achieve a relatively thick solid electrolyte, which is helpful for achieving good mechanical robustness and electrical performance. Also, such polymers can also delaminate from the part during encapsulation of the capacitor, which adversely impacts electrical performance. Some attempts have been made to address this problem. U.S. Pat. No. 6,987,663 to Merker, et al., for instance, describes the use of a polymeric dispersion that covers a surface of the solid electrolyte. The polymeric dispersion generally includes poly(3,4-dioxythiophene ("PEDT") doped with a polymeric anion, such as polymeric sulfonic acid ("PSS"). Unfortunately, the addition of such a dopant significantly increases the complexity and costs of the dispersion. Furthermore, it is also difficult to disperse such polymeric layers in aqueous mediums, which is desired in certain applications.

As such, a need remains for a solid electrolytic capacitor that possesses good mechanical robustness and electrical performance.

SUMMARY OF THE INVENTION

In accordance with one embodiment of the present invention, a solid electrolytic capacitor is disclosed that comprises an anode body, a dielectric overlying the anode body, and a solid electrolyte that overlies the dielectric. The capacitor also comprises a conductive coating that overlies the solid electrolyte and includes nanoparticles formed from a poly(3,4-ethylenedioxythiophene) quaternary onium salt.

In accordance with another embodiment of the present invention, a method of forming a solid electrolytic capacitor is disclosed that comprises applying a nanodispersion to a capacitor element that comprises an anode body, a dielectric, and a solid electrolyte, wherein the nanodispersion includes a solvent and nanoparticles formed from a poly(3,4-ethylenedioxythiophene) quaternary onium salt.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying FIGURE, in which:

FIG. 1 is a cross-sectional view of one embodiment of a solid electrolytic capacitor of the present invention.

Repeat use of reference characters in the present specification and drawing is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor that includes an anode body, a dielectric overlying the anode body, and a solid electrolyte overlying the dielectric. The capacitor also comprise a conductive polymer coating that overlies the solid electrolyte and includes nanoparticles formed from a poly(3,4-ethylenedioxythiophene) quaternary onium salt, which may have the following general structure:

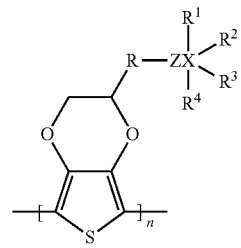

wherein,

R is $(CH_2)_a-O-(CH_2)_b$;

a is from 0 to 10, in some embodiments from 1 to 6, and in some embodiments, from 1 to 2 (e.g., 1);

b is from 0 to 18, in some embodiments from 1 to 10, and in some embodiments, from 2 to 6 (e.g., 3, 4, or 5);

Z is a negatively charged ion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;

X is nitrogen or phosphorous;

$R^1$, $R^2$, $R^3$, and $R^4$ are independently selected from the group consisting of hydrogen; substituted or unsubstituted $C_1$-$C_{10}$ alkyl groups (e.g., methyl, ethyl, n-propyl, isopropyl, n-butyl, isobutyl, sec-butyl, tert-butyl, n-pentyl, etc.); substituted or unsubstituted $C_3$-$C_{14}$ cycloalkyl groups (e.g., adamantyl, cyclopropyl, cyclobutyl, cyclopentyl, cyclooctyl, cyclohexenyl, etc.); substituted or unsubstituted $C_1$-$C_{10}$ alkenyl groups (e.g., ethylene, propylene, 2-methypropylene, pentylene, etc.); substituted or unsubstituted $C_2$-$C_{10}$ alkynyl groups (e.g., ethynyl, propynyl, etc.); substituted or unsubstituted $C_1$-$C_{10}$ alkoxy groups (e.g., methoxy, ethoxy, n-propoxy, isopropoxy, n-butoxy, t-butoxy, sec-butoxy, n-pentoxy, etc.); substituted or unsubstituted aryl groups (e.g., phenyl); substituted or unsubstituted heteroaryl groups (e.g., pyridyl, furanyl, thienyl, thiazolyl, isothiazolyl, triazolyl, imidazolyl, isoxazolyl, pyrrolyl, pyrazolyl, pyridazinyl, pyrimidinyl, quinolyl, etc.); and so forth; and n is from 2 to 2,000, in some embodiments from 4 to 1,000, and in some embodiments, from 5 to 500.

One particular embodiment of the present invention employs a poly(3,4-ethylenedioxythiophene) quaternary ammonium salt having the following structure:

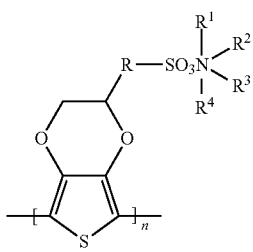

wherein, n, R, $R^1$, $R^2$, $R^3$, and $R^4$ are as defined above. In certain embodiments, for example, $R^1$, $R^2$, $R^3$, and/or $R^4$ may be hydrogen. In other embodiments, $R^1$, $R^2$, $R^3$, and/or $R^4$ may be an unsubstituted $C_1$-$C_6$ alkyl group.

The present inventors have discovered that such poly(3,4-ethylenedioxythiophenes) quaternary onium salts can have a variety of benefits when employed in a conductive coating of a solid electrolytic capacitor. For example, the polymer is highly soluble in water, which enables it to be more easily and cost effectively formed into a nanoparticle dispersion and applied over the solid electrolyte of the capacitor. Moreover, the polymer is also intrinsically conductive and does not require the addition of conventional dopants, such as polystyrene sulfonic acid. For example, the polymer may have a specific conductivity, in the dry state, of about 1 Siemen per centimeter ("S/cm") or more, in some embodiments about 10 S/cm or more, in some embodiments about 20 S/cm or more, and in some embodiments, from about 50 to about 500 S/cm.

The poly(3,4-ethylenedioxythiophenes) quaternary onium salt may be formed through a variety of techniques as would be understood by those skilled in the art. In one particular embodiment, for example, a 3,4-ethylenedioxythiophene metal salt monomer is initially polymerized in the presence of an oxidative catalyst to form a precursor polymer. The 3,4-ethylenedioxythiophene metal salt monomer may have the following structure:

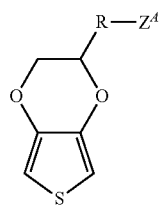

wherein, R and Z are defined above, and A is a metal cation, such as sodium, potassium, etc. Such monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above compounds. The derivatives may be made up of identical or different monomer units and used in pure form and in a mixture with one another and/or with the monomers. Oxidized or reduced forms of these precursors may also be employed.

The oxidative catalyst may be a transition metal salt, such as a salt of an inorganic or organic acid that contain ammonium, sodium, gold, iron(III), copper(II), chromium(VI), cerium(IV), manganese(IV), manganese(VII), or ruthenium (III) cations. Particularly suitable transition metal salts include halides (e.g., $FeCl_3$ or $HAuCl_4$); salts of other inorganic acids (e.g., $Fe(ClO_4)_3$, $Fe_2(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

Oxidative polymerization generally occurs in the presence of one or more solvents. Suitable solvents may include, for instance, water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction.

The polymerization of the aforementioned monomer generally results in a poly(3,4-ethylenedioxythiophenes) metal salt having the following structure:

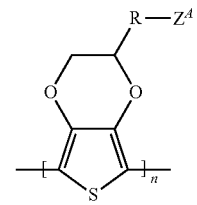

wherein, R, Z, A, and n are defined above. Such metal salts may then be converted into the onium salts of the present invention using known techniques.

In one embodiment, for example, an ion exchanger is employed to remove the metal cation from the precursor polymer and replace it with a cation (e.g., $H^+$). Particularly suitable ion exchangers for use in the present invention are acidic compounds that have positively charged mobile ions. For example, an acidic, cation exchange resin may be employed, such as an organic acid resin. Examples of such resins include, for instance, sulfonic acid resins (e.g., sulfonated styrene-divinylbenzene copolymers, sulfonated crosslinked styrene polymers, phenol-formaldehyde-sulfonic acid resins, benzene-formaldehyde-sulfonic acid resins, etc.); carboxylic acid resins; acrylic acid resins; phosphoric acid resins; etc., as well as mixtures thereof. One particularly suitable acidic cationic exchange resin is available from Lanxess under the name Lewatit® S100. Still other suitable resins are described in U.S. Pat. No. 7,569,158 to Waller, et al., which is incorporated herein in its entirety by reference thereto for all relevant purposes. The ion exchanger may be contacted with the precursor polymer and allowed to remain in contact therewith for at least about 1 hour, and in some cases, from about 2 to about 20 hours. The ion exchange resins can then be removed from the dispersion by filtration. This procedure can be repeated as desired in order to achieve a given ion concentration.

Other techniques may also be employed to remove the metal ion from the precursor polymer. For example, the precursor polymer may be exposed to an oxidant that removes electrons from the π-conjugated electronic system ("p-doping") and produces a radical cation dimer. Particularly suitable oxidants for this purpose are halogen atoms, which may be provided in the form of a strong acid (e.g., HBr, HCl, HF, etc.). A schematic illustration of the general structure of the resulting cation dimer is shown below:

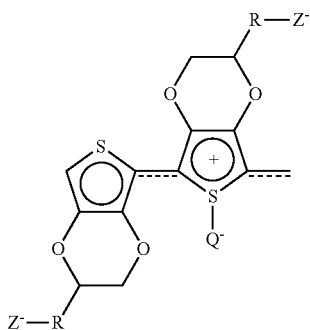

wherein, Z and R are defined above, and Q is a halogen atom, such as iodine, bromine, fluorine, chlorine, etc.

Regardless of the particular technique employed to remove the metal ion from the precursor polymer, the onium cation is thereafter incorporated into the polymer. In one embodiment, for example, the polymer system may simply be reacted with a compound containing an onium cation. Suitable onium cations may include, for instance, ammonium, phosphonium, tetramethylammonium, tetraethylammonium, tetrapropylammonium, tetra butylammonium, tetra-n-propylammonium, tetra-n-butylammonium, tetra-n-pentylammonium, tetra-n-hexyl ammonium, ethyl trimethylammonium, 2,2,2 trifluoroethyl trimethylammonium, 2,2,2 trifluoroethyl triethylammonium, ethyl tri(trifluoromethyl)ammonium, methyl tri(trifluoromethyl)ammonium, benzyltrimethylammonium, benzyltriethylammonium, trimethyl(2-methoxyethyl)ammonium, trimethyl[2-(2-methoxyethoxy)ethyl]ammonium, methyldiethyl-(2-methyoxyethyl)ammonium, triethyl (2-methyoxyethyl)ammonium, diethyl dimethylammonium, diethyl di(trifluoromethyl)ammonium, diethyl methyl trifluoromethylammonium, triethyl methylammonium, methyl tripropylammonium, ethyl tripropylammonium, trimethyl propylammonium, ethyl dimethyl propylammonium, diethyl methyl propylammonium, triethyl propylammonium, dimethyl dipropylammonium, ethyl methyl dipropylammonium, diethyl dipropylammonium, trimethyl butylammonium, ethyl dimethyl butylv, diethyl methyl butylammonium, triethyl butylammonium, tripropyl butylammonium, dimethyl dibutylammonium, ethyl methyl dibutylammonium, diethyl dibutylammonium, tetraphenylphosphonium, etc. Still other suitable cations are described in U.S. Patent Application Publication No. 2006/0247472 to Siggel, et al., which is incorporated herein in its entirety by reference thereto for all purposes.

Reaction of the onium compound with the precursor generally occurs in the presence of one or more solvents, such as described above. Water is particularly suitable for use in the present invention. The temperature at which the reaction occurs typically varies from about 10° C. to about 100° C., and in some embodiments, from about 15° C. to about 75° C. Upon completion of the reaction, known filtration techniques may be employed to remove any salt impurities. One or more washing steps may also be employed to purify the dispersion.

The resulting dispersion contains a plurality of nanoparticles from the poly(3,4-ethylenedioxythiophene) quaternary onium salt. The nanoparticles typically have an average diameter of from about 1 to about 200 nanometers, in some embodiments from about 2 to about 100 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the nanoparticles in the dispersion may vary depending on the desired viscosity of the dispersion and the particular manner in which the dispersion is to be applied to the capacitor. Typically, however, the nanoparticles constitute from about 0.1 to about 10 wt. %, in some embodiments from about 0.4 to about 5 wt. %, and in some embodiments, from about 0.5 to about 4 wt. % of the dispersion. Solvent(s) may likewise constitute from about 90 wt. % to about 99.9 wt. %, in some embodiments from about 95 wt. % to about 99.6 wt %, and in some embodiments, from about 96 wt. % to about 99.5 wt. % of the dispersion. While other solvents may certainly be employed, it is generally desired that water is the primary solvent such that the dispersion is considered an "aqueous" dispersion. In most embodiments, for example, water constitutes at least about 50 wt. %, in some embodiments at least about 75 wt. %, and in some embodiments, from about 90 wt. % to 100 wt. % of the solvent(s) used in the dispersion.

One beneficial aspect of the present invention is that a physically and chemically stable dispersion may be formed in the present invention without the need for additional components, such as polymeric anions (e.g., polystyrene sulfonic acid) conventionally required to form stable particle dispersions from poly(3,4-ethylenedioxythiophene). The dispersion of the present invention may be substantially free of such polymeric anions. Nevertheless, it should be understood that polymeric anions may be employed in certain embodiments of the present invention. When utilized, however, the polymeric anions are typically present in an amount of less than about 1 wt % of the dispersion. If desired, certain other ingredients may of course be incorporated into the dispersion. For example, the dispersion may contain a binder to further enhance the adhesive nature of the polymeric layer. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses.

Crosslinking agents and/or surfactants may also be employed to enhance the adhesion capacity of the binders.

As indicated above, the nanodispersion of the present invention is used to form a conductive coating that overlies the solid electrolyte of an electrolytic capacitor. One benefit of employing such a dispersion is that it may be able to penetrate into the edge region of the capacitor to achieve good electrical contact with the solid electrolyte and increase the adhesion to the capacitor body. This results in a more mechanically robust part, which may reduce equivalent series resistance and leakage current. It should be understood that the use of the term "overlies" herein means simply that the particular coating or layer is applied after the preceding layer. Some portion of the coating or layer may, however, intermix or flow through the preceding layer such that the coating or layer does not strictly cover the entire preceding coating or layer. For example, some portion of the conductive coating may pass into the pores of the anode body where no solid electrolyte is located. Nevertheless, the solid electrolyte still overlies the conductive coating. Furthermore, the term "overlies" does not preclude the use of additional layers between the preceding layer. For example, one or more layers may be applied between the solid electrolyte and the conductive coating, yet the conductive coating is still considered to overlie the solid electrolyte.

Referring to FIG. 1, one particular embodiment of a solid electrolytic capacitor 10 is shown that contains a conductive coating 22 that overlies a solid electrolyte 20. The conductive coating 22 is formed from the above-described nanodispersion, which may be applied using a variety of known techniques, such as by dipping, spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the dispersion may be dried and washed. Drying may be performed at temperatures of from about −10° C. to about 250° C., and in some embodiments, from about 0° C. to about 200° C. The resulting dried coating 22 may have a thickness of from about 0.2 micrometers ("μm") to about 100 μm, in some embodiments from about 1 μm to about 40 μm, and in some embodiments, from about 3 μm to about 10 μm. It should be understood that the thickness of the coating is not necessarily the same at all locations. Nevertheless, the average thickness of the coating on the substrate generally falls within the ranges noted above.

The capacitor 10 of FIG. 1 also an anode body 12 that may be formed from a valve metal composition having a high specific charge, such as about 40,000 μF*V/g or more, in some embodiments about 50,000 μF*V/g or more, in some embodiments about 60,000 μF*V/g or more, and in some embodiments, from about 70,000 to about 700,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body 12. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 m$^2$/g, in some embodiments from about 0.5 to about 5.0 m$^2$/g, and in some embodiments, from about 1.0 to about 2.0 m$^2$/g. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 g/cm$^3$, in some embodiments from about 0.2 to about 4.0 g/cm$^3$, and in some embodiments, from about 0.5 to about 3.0 g/cm$^3$.

To facilitate the construction of the anode body 12, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

As shown in FIG. 1, an anode lead 15 may also be attached to the anode body 12. The anode lead 15 may be in the form of a wire, sheet, etc., and may be formed from a valve metal compound, such as tantalum, niobium, niobium oxide, etc. Attachment of the lead may be accomplished using known techniques, such as by welding the lead to the body 12 or embedding it within the anode body during formation.

Referring again to FIG. 1, a dielectric 14 overlies the anode body. The dielectric 14 may be formed by anodizing the anode body so that it generally coats the exterior surface of the anode body 12 and is also present within its interior pore structure. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as described above. The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc. A current may be passed through the electrolyte to form the dielectric 14. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric 14 may be formed on a surface of the anode body 12 and within its pores.

As indicated above, the solid electrolyte 20 overlies the dielectric 14. The thickness of the solid electrolyte 20 may vary, but is often from about 0.1 µm to about 100 ƒm, in some embodiments from about 0.5 µm to about 20 µm, and in some embodiments, from about 1 µm to about 5 µm. The materials used to form the solid electrolyte 20 may also vary as is known in the art. In one embodiment, for example, manganese dioxide may be employed as the solid electrolyte. Manganese dioxide may be formed, for instance, through the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, the solid electrolyte may include a conductive polymer, such as polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly(3,4-ethylenedioxythiophene) ("PEDT"). Methods for forming such polythiophene derivatives are well known in the art and described, for instance, in U.S. Pat. No. 6,987,663 to Merker, et al. For example, the polythiophene derivatives may be formed from a monomeric precursor, such as 3,4-alkylenedioxythiophene, which undergoes oxidative polymerization in the presence of an oxidizing agent.

Various methods may be utilized to apply the solid electrolyte onto the anode part. In one embodiment, an oxidizing agent and a conductive polymer precursor may be applied, either sequentially or together, such that a polymerization reaction occurs in situ on the part. As an example, the monomeric precursor (e.g., 3,4-ethylenedioxythiophene) may initially be mixed with the oxidizing agent to form a solution. One suitable oxidizing agent is CLEVIOS™ C, which is iron III toluene-sulfonate and sold by H.C. Starck. CLEVIOS™ C is a commercially available catalyst for CLEVIOS™ M, which is 3,4-ethylene dioxythiophene, a PEDT monomer also sold by H.C. Starck. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive polymer coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

Regardless of the particular manner in which it is formed, the solid electrolyte may be healed upon application to the part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

The capacitor of the present invention may optionally contain other layers in addition to those noted above. For example, a metal layer may be employed that acts as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The metal layer may overlie the solid electrolyte and/or the conductive coating. A carbonaceous layer may also be employed that limits contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

The electrolytic capacitor of the present invention may also contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osaka, et al., which is incorporated herein in its entirety by reference thereto for all purposes.

Once the capacitor element is attached, the lead frame may be enclosed within a casing, which may then be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element is encapsulated so that at least a portion of the anode and cathode terminations are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance (CAP):

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current (DCL):

Leakage current ("DCL") was measured using a leakage test set that measures leakage current at a temperature of 25° C. and at the rated voltage after a minimum of 30 seconds.

Temperature/Pressure Test

Certain electrical properties were determined after temperature and pressure testing. More particularly, 100 samples were put into a pressure cooker filled with water for 100 hours at 125° C. The samples were then tested in the manner described above.

Synthesis of Precursor Compounds

In the following examples, the monomer used to form the polymer was a sodium salt of 3-(2,3-dihydrothieno[3,4-b][1,4]dioxin-2-ylmethoxy)-propane-1-sulfonate ("EDOTSNa"), which has the following structure:

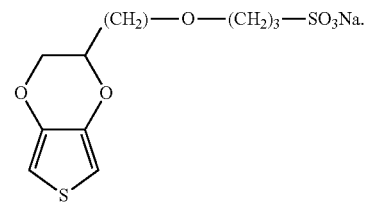

The monomer was formed as follows. Initially, 5.86 grams of pure NaH and 240 milliliters of toluene were added to three necks of a round bottom flask equipped with a stirrer, thermometer, and condenser placed in a heating mantle. The mixture was kept under argon. A solution of 40 grams 2,3-dihydro-thieno[3,4-b][1,4]dioxin-2-yl)-methanol (EDOT MeOH) and 3,4-dihydro-2H-thieno[3,4-b][1,4]dioxepin-3-ol (ProDOT-OH) (ratio 80:20) in 400 ml toluene were added drop wise for 15 minutes. The mixture was stirred at 40° C. for 1 hour. A solution of 28.4 grams of propane sultone in 240 milliliters toluene was added drop wise during 15 minutes. The resulting mixture was heated at reflux for an additional 2 hours. The solution was cooled to ambient temperature and 3.6 liters of acetone was added quickly. The precipitated product was filtered through a fine porosity frit and then dried under vacuum at ambient temperature for 6 days. 61 grams of sodium 3-(2,3-dihydrothieno[3,4-b][1,4]dioxin-2-yl-methoxy)-propane-1-sulfonate (EDOTSNa) was obtained (83% yield).

Once formed, the EDOTSNa monomer was then polymerized to form poly[3-(2,3-dihydrothieno[3,4-b][1,4]dioxin-2-ylmethoxy)-propane-1-sulfonate], sodium ("PEDOTSNa"), which has the following structure:

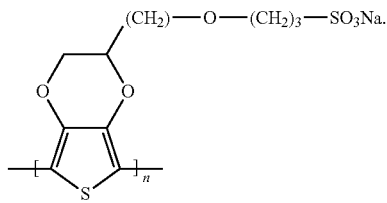

A variety of different polymerization techniques may be employed to obtain the PEDTOSNa polymer from the EDOT-SNa monomer. Such techniques are generally described, for instance, in U.S. Pat. No. 6,635,729. One such exemplary technique, which employs iron tosylate as the oxidative catalyst, will now be described in more detail. Initially, 15 grams of EDOTSNa was dissolved in 85.6 milliliters of water. 216 grams of a solution of 40% iron tosylate in butanol was then added drop wise during 20 minutes. The mixture was mixed at room temperature for 2 days and at 65° C. for 1 day. Thereafter, the mixture was cooled to ambient temperature and the resulting black precipitate was removed and washed with 180 milliliters of ethanol. The washed paste was dried at 50° C. for 3 days to obtain 24.4 grams of dry product, which contained 20 wt. % polymer and 80 wt. % iron tosylate.

Other catalysts can also be employed such as described above. One example of a process that employs iron (III) chloride as an oxidative catalyst will now be described in more detail. Initially, 5 grams of EDOTSNa was dissolved in 29 milliliters of water. 21.37 grams of iron trichloride hexahydrate in 57 milliliters of water was then added drop wise during 5 minutes. The mixture was stirred at ambient temperature for 3 days. Thereafter, the product was filtered and washed 2 times with 17 milliliters of water, 3 times with 17 milliliters of chloroform, and 3 times with 17 milliliters of ethanol. The product was dried under vacuum at 40° C. for 3 days to obtain 2.75 grams of PEDTOSNa.

Example 1

The ability to form poly[3-(2,3-dihydrothieno[3,4-b][1,4]dioxin-2-ylmethoxy)-propane-1-ammonium sulfonate] ("PEDOTSNH$_4$"), which has the structure below, was demonstrated:

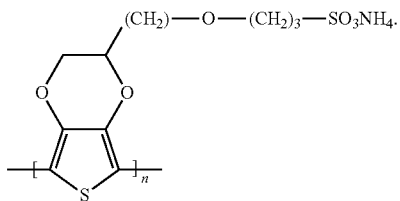

Poly[3-(2,3-dihydrothieno[3,4-b][1,4]dioxin-2-yl-methoxy)-propane-1-ammonium sulfonate] ("PEDOT-SNH$_4$") was formed by initially mixing 2 grams of PEDOT-SNa with 20 milliliters of water and 1.25 grams of HCl (35%). The mixture was stirred for 24 hours. The product was then filtered and washed with 10 milliliters of water. The obtained paste was mixed with 120 milliliters of water and 80 milliliters of ammonia water (25%). The mixture was stirred at ambient temperature for 6 days. Reaction was monitored by UV/VIS measurements. Salt impurities were removed by nanofiltration. The obtained polymer mixture was diluted to a polymer concentration of 1 wt. %.

Example 2

Poly[3-(2,3-dihydrothieno[3,4-b][1,4]dioxin-2-yl-methoxy)-propane-1-ammonium sulfonate] ("PEDOT-SNH$_4$") was formed by initially mixing 2 grams of PEDOT-SNa with 20 milliliters of water and 1.25 grams of HCl (35%). The mixture was stirred for 24 hours. The product was then filtered and washed with 10 milliliters of water. The obtained paste was mixed with 120 milliliters of water and 80 milliliters of ammonia water (25%). The mixture was stirred at ambient temperature for 6 days. Reaction was monitored by UV/VIS measurements. Salt impurities were removed by nanofiltration. The obtained polymer mixture was diluted to a polymer concentration of 1 wt. %.

Example 3

The ability to form poly[3-(2,3-dihydrothieno[3,4-b][1,4]dioxin-2-ylmethoxy)-propane-1-tetramethylammonium sulfonate] ("PEDOTSMe$_4$N"), which has the structure below, was demonstrated:

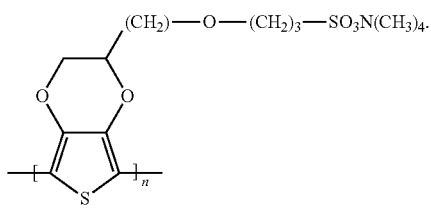

The polymer was formed as follows. Initially, 2 grams of PEDOTSNa, 140 milliliters of water, 2.15 grams of tetramethylammonium bromide, and 10 grams of isopropyl alcohol were mixed at ambient temperature for 3 days. The temperature was then increased to 55° C. and the solution was mixed for 24 hours. Thereafter, the solution was cooled to the room temperature. Salt impurities were removed by nanofiltration. The obtained polymer mixture was diluted to a polymer concentration of 1 wt. %. The ratio of water and alcohols (methanol, ethanol and isopropyl alcohol) was adjusted according to final use with the amount of water being at least greater than 50 wt. %.

Example 4

The ability to form poly[3-(2,3-dihydrothieno[3,4-b][1,4]dioxin-2-ylmethoxy)-propane-1-tetraethylammonium sulfonate] ("PEDOTSEt$_4$N"), which has the structure below, was demonstrated:

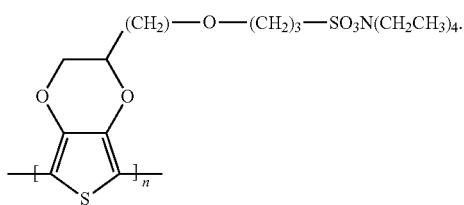

The polymer was formed as described in Example 4, except that tetraethylammonium bromide was instead employed as a reactant.

Example 5

The ability to form poly[3-(2,3-dihydrothieno[3,4-b][1,4] dioxin-2-ylmethoxy)-propane-1-tetrabutylammonium sulfonate] ("PEDOTSBu$_4$N"), which has the structure below, was demonstrated:

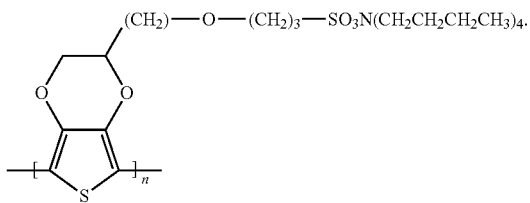

The polymer was formed as follows. Initially, 2 grams of PEDOTSNa, 140 milliliters of water, 4.5 grams of tetrabutylammonium bromide, and 20 grams of acetonitrile were mixed at ambient temperature for 2 days. The mixture was then diluted by water, acetonitrile, or dimethylsulfoxide to achieve a polymer concentration of 1 wt. %.

Example 6

A tantalum anode with a size of 1.70 mm×1.05 mm×2.4 mm was anodized at 13.5V in a liquid electrolyte (aqueous solution of orthophosphoric acid) to 100 μF. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a layer of poly(3,4-ethylenedioxythiophene) was formed on the surface of the dielectric. The parts were washed in methanol to remove reaction by-products, re-anodized in a liquid electrolyte (aqueous solution of 4-toluene sulfonic acid), and washed again in methanol. The polymerization cycle was repeated 4 times. Thereafter, the part was dipped into a dispersed poly[3-(2,3-dihydrothieno[3,4-b][1,4]dioxin-2-ylmethoxy)-propane-1-ammonium sulfonate] ("PEDOTSNH$_4$"—Example 1) having a solids content 1% and dried at 125° C. for 20 minutes. Once again, this process was repeated 2 times. The parts were then coated by graphite and dipping silver and assembled by gluing the anodes into a leadframe pocket, cutting and laser welding the anode wire into the leadframe upstand, and molding the capacitor. Multiple parts (1,000 pieces) were made in this manner for testing.

Example 7

1,000 pieces of capacitors were prepared as described in Example 6, except that the poly[3-(2,3-dihydrothieno[3,4-b][1,4]dioxin-2-ylmethoxy)-propane-1-ammonium sulfonate] ("PEDOTSNH$_4$"—Example 2) was used as the dispersed polymer.

Example 8

1,000 pieces of capacitors were prepared as described in Example 6, except that the poly[3-(2,3-dihydrothieno[3,4-b][1,4]dioxin-2-ylmethoxy)-propane-1-tetramethylammonium sulfonate] ("PEDOTSMe$_4$N"—Example 3) was used as the dispersed polymer.

Example 9

1,000 pieces of capacitors were prepared as described in Example 6, except that the poly[3-(2,3-dihydrothieno[3,4-b][1,4]dioxin-2-ylmethoxy)-propane-1-tetraethylammonium sulfonate] ("PEDOTSEt$_4$N"—Example 4) was used as the dispersed polymer.

Example 10

1,000 pieces of capacitors were prepared as described in Example 6, except that the poly[3-(2,3-dihydrothieno[3,4-b][1,4]dioxin-2-ylmethoxy)-propane-1-tetrabutylammonium sulfonate] ("PEDOTSBu$_4$N"—Example 5) was used as the dispersed polymer.

Comparative Example 1,000 pieces of capacitors were prepared as described in Example 6, except that the poly(3,4-ethylenedioxythiophene) ("Clevios™ K"—solids content of 1%) was used as the dispersed polymer.

The finished capacitors of Examples 6-10 and Comparative Example were then tested for electrical performance. The median results of leakage current, ESR, and capacitance are set forth below in Table 1.

TABLE 1

| | Electrical Properties | | |
|---|---|---|---|
| | DCL [μA] | ESR [mΩ] | Cap [μF] |
| Example 6 | 38.2 | 64 | 91.5 |
| Example 7 | 47.5 | 68 | 92.0 |
| Example 8 | 20.1 | 74 | 91.6 |
| Example 9 | 18.6 | 269 | 91.9 |
| Example 10 | 16.6 | 1364 | 91.3 |
| Comparative Example | 48.5 | 75 | 91.3 |

100 samples of the finished capacitors of Examples 6-10 and Comparative Example were then tested after "temperature/pressure testing" as described above. The results are shown below in Table 2.

TABLE 2

| | Electrical Properties after Temperature/PressureTesting | | |
|---|---|---|---|
| | DCL [μA] | ESR [mΩ] | Cap [μF] |
| Example 6 | 5.1 | 66 | 98.6 |
| Example 7 | 5.4 | 69 | 98.3 |
| Example 8 | 12.0 | 76 | 98.4 |
| Example 9 | 14.9 | 264 | 98.1 |

TABLE 2-continued

Electrical Properties after Temperature/Pressure Testing

| | DCL [μA] | ESR [mΩ] | Cap [μF] |
|---|---|---|---|
| Example 10 | 34.8 | 1377 | 98.0 |
| Comparative Example | 12.9 | 79 | 98.0 |

100 samples of the finished capacitors of Examples 6-10 and Comparative Example were then tested after three times applied "lead-free reflow" as described above. The results are shown below in Table 3.

TABLE 3

Electrical Properties after 3 × Lead-free Reflow

| | DCL [μA] | ESR [mΩ] | Cap [μF] |
|---|---|---|---|
| Example 6 | 30.1 | 65 | 91.6 |
| Example 7 | 31.2 | 61 | 92.1 |
| Example 8 | 20.6 | 73 | 91.8 |
| Example 9 | 20.3 | 246 | 90.7 |
| Example 10 | 21.3 | 1174 | 90.4 |
| Comparative Example | 106.1 | 78 | 89.0 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
   an anode body;
   a dielectric overlying the anode body;
   a solid electrolyte overlying the dielectric; and
   a conductive coating that overlies the solid electrolyte, wherein the conductive coating includes nanoparticles formed from a poly(3,4-ethylenedioxythiophene) quaternary onium salt, wherein the conductive coating is generally free of poly(styrene sulfonic acid).

2. The solid electrolytic capacitor of claim 1, wherein the poly(3,4-ethylenedioxythiophene) quaternary onium salt has the following general structure:

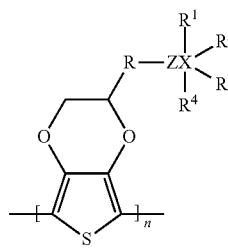

wherein,
R is $(CH_2)_a$—O—$(CH_2)_b$;
a is from 0 to 10;
b is from 0 to 18;
Z is a negatively charged ion;
X is nitrogen or phosphorous;
$R^1$, $R^2$, $R^3$, and $R^4$ are independently selected from the group consisting of hydrogen, substituted or unsubstituted $C_1$-$C_{10}$ alkyl groups, substituted or unsubstituted $C_3$-$C_{14}$ cycloalkyl groups, substituted or unsubstituted $C_1$-$C_{10}$ alkenyl groups, substituted or unsubstituted $C_2$-$C_{10}$ alkynyl groups, substituted or unsubstituted $C_1$-$C_{10}$ alkoxy groups, substituted or unsubstituted aryl groups, substituted or unsubstituted heteroaryl groups, and combinations thereof; and
n is from 2 to 2,000.

3. The solid electrolytic capacitor of claim 2, wherein "a" is from 1 to 2 and "b" is from 2 to 6.

4. The solid electrolytic capacitor of claim 2, wherein Z is $SO_3^-$.

5. The solid electrolytic capacitor of claim 2, wherein X is nitrogen.

6. The solid electrolytic capacitor of claim 2, wherein $R^1$, $R^2$, $R^3$, and $R^4$ are independently selected from the group consisting of hydrogen, $C_1$-$C_6$ alkyl groups, and combinations thereof.

7. The solid electrolytic capacitor of claim 1, wherein the poly(3,4-ethylenedioxythiophene) quaternary onium salt has the following general structure:

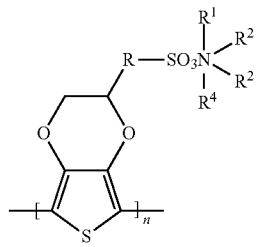

wherein,
R is $(CH_2)_a$—O—$(CH_2)_b$;
a is from 1 to 6;
b is from 1 to 10;
$R^1$, $R^2$, $R^3$, and $R^4$ are independently selected from the group consisting of hydrogen and $C_1$-$C_{10}$ alkyl groups; and
n is from 4 to 1000.

8. The solid electrolytic capacitor of claim 1, wherein the poly(3,4-ethylenedioxythiophene) quaternary onium salt has the following structure:

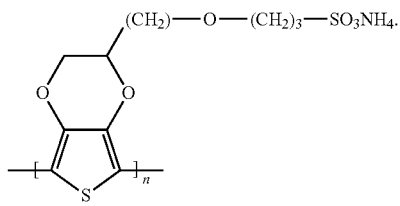

9. The solid electrolytic capacitor of claim 1, wherein the poly(3,4-ethylenedioxythiophene) quaternary onium salt has one of the following structures:

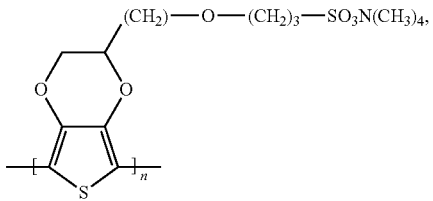

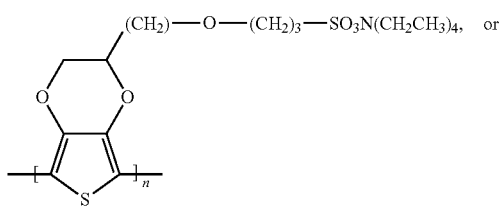

-continued

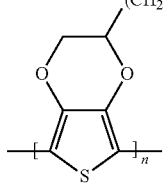

10. The solid electrolytic capacitor of claim 1, wherein the solid electrolyte contains a conductive polymer.

11. The solid electrolytic capacitor of claim 10, wherein the conductive polymer of the solid electrolyte includes poly(3,4-ethylenedioxythiophene).

12. The solid electrolytic capacitor of claim 1, wherein the nanoparticles have an average size of from about 2 to about 100 nanometers.

13. The solid electrolytic capacitor of claim 1, wherein the thickness of the conductive coating is from about 1 μm to about 40 μm.

14. The solid electrolytic capacitor of claim 1, wherein the anode body includes tantalum, niobium, or an electrically conductive oxide thereof.

* * * * *